(12) United States Patent
Miyabe et al.

(10) Patent No.: US 11,219,870 B2
(45) Date of Patent: *Jan. 11, 2022

(54) SEPARATION MEMBRANE (71) Applicant: NITTO DENKO CORPORATION, Ibaraki (JP)

(72) Inventors: Tomotsugu Miyabe, Osaka (JP); Atsuhito Komoto, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 200 days.

This patent is subject to a terminal disclaimer.

(21) Appl. No.: 16/576,354

(22) Filed: Sep. 19, 2019

(65) Prior Publication Data

US 2020/0094197 A1    Mar. 26, 2020

(30) Foreign Application Priority Data

Sep. 20, 2018    (JP) .............................. JP2018-176625

(51) Int. Cl.
*B01D 71/56* (2006.01)
*B01D 69/10* (2006.01)
(Continued)

(52) U.S. Cl.
CPC .............. *B01D 71/56* (2013.01); *B01D 69/10* (2013.01); *B01D 71/62* (2013.01); *B01D 67/0088* (2013.01)

(58) Field of Classification Search
CPC ........ B01D 71/56; B01D 69/10; B01D 71/62; B01D 67/0088; B01D 2325/16;
(Continued)

(56) References Cited

U.S. PATENT DOCUMENTS 5,051,178 A     9/1991  Uemura et al.
5,178,766 A *   1/1993  Ikeda ................... B01D 61/022
                                             210/652
(Continued)

FOREIGN PATENT DOCUMENTS

EP    0085111      8/1983
JP    S5824303     2/1983
(Continued)

OTHER PUBLICATIONS

Malaisamy, R. et al., "High-Flux Nanofiltration Membranes Prepared by Adsorption of Multilayer Polyelectrolyte Membranes on Polymeric Supports," Langmuir, vol. 21, No. 23, 2005, pp. 10587-10592.

(Continued)

*Primary Examiner* — Bradley R Spies
*Assistant Examiner* — Jeannie McDermott
(74) *Attorney, Agent, or Firm* — Hamre, Schumann, Mueller & Larson, P.C.

(57) ABSTRACT

A separation membrane (10) of the present disclosure includes: a separation functional layer (30) composed of a polyamide; and a coating (40) covering the separation functional layer (30) and containing a polymer having a repeating unit represented by the following formula (1). In the formula (1), $N^+$ is a nitrogen atom constituting a quaternary ammonium cation, and $R^1$ and $R^2$ are each independently a substituent containing a carbon atom bonded to the nitrogen atom.

(Continued)

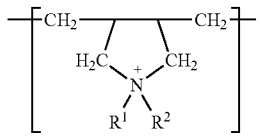

(1)

7 Claims, 1 Drawing Sheet

(51) Int. Cl.
    *B01D 71/62*      (2006.01)
    *B01D 67/00*      (2006.01)

(58) Field of Classification Search
CPC ............ B01D 2325/20; B01D 2323/40; B01D 71/82; B01D 67/0093; B01D 69/02; B01D 69/125; B01D 67/0006; B01D 69/12
See application file for complete search history.

(56) References Cited

U.S. PATENT DOCUMENTS 5,733,602 A     3/1998     Hirose et al.

2014/0336084 A1*   11/2014   Pugia ............... G01N 33/54393
                                                                  506/40
2015/0191412 A1    7/2015   Kang et al.
2016/0279581 A1*   9/2016   Echizen ............. B01D 67/0088
2016/0325239 A1   11/2016   Adden et al.
2020/0164320 A1*   5/2020   De Grooth ............. B01D 71/68

FOREIGN PATENT DOCUMENTS

| JP | H01180208 | 7/1989 |
|---|---|---|
| JP | H05507654 | 11/1993 |
| JP | H08224452 | 9/1996 |
| JP | 2015089532 | 5/2015 |
| KR | 20130037365 | 4/2013 |
| WO | 9220438 | 11/1992 |
| WO | 2018001359 | 1/2018 |
| WO | 2019195380 | 10/2019 |

OTHER PUBLICATIONS

Extended European Search Report issued for European Application No. 19196339.6, dated Feb. 25, 2020, 5 pages.
Malaisamy, R., "Polyelectrolyte modification of nanofiltration membrane for selective removal of monovalent anions," Separation and Purification Technology 77 (2011) 367-374.
Office Action issued for European Patent Application No. 19196339.6, dated Jun. 5, 2020, 5 pages.

* cited by examiner

FIG.1

SEPARATION MEMBRANE

BACKGROUND OF THE INVENTION

1. Field of the Invention

The present disclosure relates to separation membranes.

2. Description of Related Art

Separation membranes are widely used as reverse osmosis membranes (RO membranes) or nanofiltration membranes (NF membranes) in various applications such as production of ultrapure water, desalination of seawater, and treatment of waste water. Examples of such separation membranes include composite semipermeable membranes having a porous support and a separation functional layer provided on the porous support. The separation functional layer is made of an organic compound such as polyamide, polysulfone, and cellulose acetate. In the field of reverse osmosis membranes, a polyamide membrane obtained by polymerization of an amine and an acid halide is known to be suitable as the separation functional layer. The polyamide membrane is typically an aromatic polyamide membrane obtained by interfacial polymerization of an aromatic polyfunctional amine and an aromatic polyfunctional acid halide. The porous support can be formed of a substrate such as a non-woven fabric and a microporous layer provided on the substrate.

US 2016/0325239 A1 describes a composite semipermeable membrane including a coating layer including a polymer having a quaternary ammonium group.

SUMMARY OF THE INVENTION

Resistance to various substances, such as cationic substances, contained in a raw liquid to be treated is required of separation membranes. Separation membranes whose water permeability is decreased little by contact with a raw liquid containing a cationic substance are demanded.

The present disclosure provides a separation membrane including:

a separation functional layer composed of a polyamide; and a coating covering the separation functional layer and containing a polymer having a repeating unit represented by the following formula (1).

In the formula (1), N⁺ is a nitrogen atom constituting a quaternary ammonium cation, and $R^1$ and $R^2$ are each independently a substituent containing a carbon atom bonded to the nitrogen atom.

The technique of the present disclosure makes it possible to provide a separation membrane whose water permeability is decreased little by contact with a raw liquid containing a cationic substance.

DETAILED DESCRIPTION OF THE INVENTION

Hereinafter, an embodiment of the present disclosure will be described with reference to the drawings. The present disclosure is not limited to the following embodiment.

Figure 1:
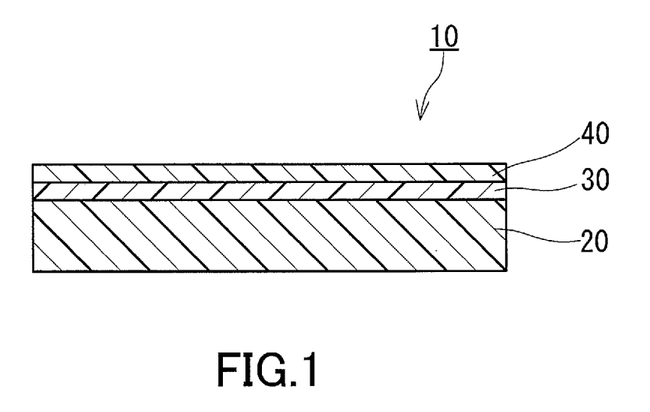
FIG. 1 is a cross-sectional view of a separation membrane according to an embodiment of the present disclosure.

As shown in FIG. 1, a separation membrane 10 includes a porous support membrane 20, a separation functional layer 30, and a coating 40. The porous support membrane 20, the separation functional layer 30, and the coating 40 are stacked in this order. The separation functional layer 30 and the coating 40 are supported by the porous support membrane 20. The separation functional layer 30 is disposed on the porous support membrane 20. The coating 40 is disposed on the separation functional layer 30. The coating 40 is in direct contact with the separation functional layer 30. The separation membrane 10 can be a composite semipermeable membrane.

The separation functional layer 30 is composed of a polyamide. The coating 40 can prevent a cationic substance contained in raw water from adsorbing onto the surface of the separation membrane 10. Thus, a water permeability decrease caused by contact with raw water containing a cationic substance is reduced.

The separation membrane 10 can be produced by the following method.

First, the porous support membrane 20 is prepared as a support. The porous support membrane 20 is not particularly limited as long as it is a membrane on the surface of which a separation functional layer can be formed. The porous support membrane 20 used may be an ultrafiltration membrane having a non-woven fabric on which a microporous layer with an average pore diameter of 0.01 to 0.4 μm is formed. Examples of the material forming the microporous layer include polyarylethersulfones such as polysulfone and polyethersulfone, polyimide, and polyvinylidene fluoride. From the viewpoint of chemical stability, mechanical stability, and thermal stability, polysulfone or polyarylethersulfone can be used. A self-supporting porous support membrane having an average pore diameter as specified above and made of a thermosetting resin such as epoxy resin can also be used. The thickness of the porous support membrane 20 is not particularly limited. The thickness is, for example, in the range of 10 to 200 μm and may be in the range of 20 to 75 μm.

In the present specification, the "average pore diameter" refers to a value calculated by the following method. First, a surface or cross-section of the membrane or layer is observed with an electron microscope (e.g., a scanning electron microscope), and the diameters of a plurality of observed pores (e.g., 10 randomly selected pores) are actually measured. The average of the actually measured diameters of the pores is defined as the "average pore diameter". The "diameter of a pore" refers to the longest diameter of the pore, and specifically refers to the diameter of the smallest of the circles that can enclose the pore.

Next, a first solution containing a material of the separation functional layer 30 is brought into contact with the porous support membrane 20. The first solution is typically an aqueous solution containing a polyfunctional amine as the material of the separation functional layer 30 (this solution will hereinafter be referred to as "aqueous amine solution"). The contact of the aqueous amine solution with the porous support membrane 20 results in the formation of an amine-containing layer on a surface of the porous support membrane 20. The aqueous amine solution may contain, in addition to water, a polar solvent other than water, such as an alcohol. A polar solvent other than water, such as an alcohol, may be used instead of water.

The polyfunctional amine is an amine having a plurality of reactive amino groups. Examples of the polyfunctional amine include aromatic polyfunctional amines, aliphatic polyfunctional amines, and cycloaliphatic polyfunctional amines.

Examples of the aromatic polyfunctional amine include m-phenylenediamine, p-phenylenediamine, o-phenylenediamine, 1,3,5-triaminobenzene, 1,2,4-triaminobenzene, 3,5-diaminobenzoic acid, 2,4-diaminotoluene, 2,6-diaminotoluene, N,N'-dimethyl-m-phenylenediamine, 2,4-diaminoanisole, amidol, and xylylenediamine.

Examples of the aliphatic polyfunctional amine include ethylenediamine, propylenediamine, tris(2-aminoethyl) amine, and n-phenyl-ethylenediamine.

Examples of the cycloaliphatic polyfunctional amine include 1,3-diaminocyclohexane, 1,2-diaminocyclohexane, 1,4-diaminocyclohexane, piperazine, and piperazine derivatives.

One polyfunctional amine selected from the above polyfunctional amines may be used alone, or a combination of two or more selected from the above polyfunctional amines may be used.

The polyfunctional amine may be at least one selected from the group consisting of piperazine and a piperazine derivative. That is, the separation functional layer 30 may be composed of a polyamide containing, as a monomer unit, at least one selected from the group consisting of piperazine and a piperazine derivative. Such a polyamide exhibits superior divalent ion selective-separation performance.

The piperazine derivative is a compound obtained by substitution of at least one hydrogen atom bonded to a carbon atom or nitrogen atom of piperazine with a substituent. Examples of the substituent include an alkyl group, an amino group, and a hydroxy group. Examples of the piperazine derivative include 2,5-dimethylpiperazine, 2-methylpiperazine, 2,6-dimethylpiperazine, 2,3,5-trimethylpiperazine, 2,5-diethylpiperazine, 2,3,5-triethylpiperazine, 2-n-propylpiperazine, 2,5-di-n-butylpiperazine, and 4-aminomethylpiperazine.

One compound selected from piperazine and the above piperazine derivatives may be used alone as the polyfunctional amine, or a combination of two or more selected from piperazine and the above piperazine derivatives may be used as the polyfunctional amine.

In the present specification, the divalent ion selective-separation performance is a property evaluated by the divalent ion rejection ratio in combination with the difference between the monovalent ion rejection ratio and the divalent ion rejection ratio. When the divalent ion rejection ratio is high and the monovalent ion rejection ratio is low, the divalent ion selective-separation performance can be considered superior. When the difference between the monovalent ion rejection ratio and the divalent ion rejection ratio is small, the divalent ion selective-separation performance cannot be considered superior even if the divalent ion rejection ratio is high.

In order to facilitate the formation of the amine-containing layer and improve the performance of the separation functional layer 30, a polymer such as polyvinyl alcohol, polyvinylpyrrolidone, and polyacrylic acid, or a polyhydric alcohol such as sorbitol and glycerin may be added to the aqueous amine solution.

The concentration of the amine component in the aqueous amine solution may be in the range of 0.1 to 15 wt % and may be in the range of 1 to 10 wt %. When the concentration of the amine component is properly adjusted, the occurrence of defects such as pinholes in the separation functional layer 30 can be reduced. Additionally, the separation functional layer 30 having high salt rejection performance can be formed. Further, the proper adjustment of the concentration of the amine component leads to proper adjustment of the thickness of the separation functional layer 30, thus resulting in the separation membrane 10 capable of achieving a sufficient permeation flux.

The method for bringing the aqueous amine solution into contact with the porous support membrane 20 is not particularly limited. A method in which the porous support membrane 20 is immersed in the aqueous amine solution, a method in which the aqueous amine solution is applied to the porous support membrane 20, or a method in which the porous support membrane 20 is sprayed with the aqueous amine solution, can be used as appropriate. The step of bringing the aqueous amine solution into contact with the porous support membrane 20 may be followed by the step of removing the excess of the aqueous amine solution from the porous support membrane 20. For example, the excess of the aqueous amine solution can be removed from the porous support membrane 20 by extending the amine-containing layer with a rubber roller. The removal of the excess of the aqueous amine solution can result in the formation of the separation functional layer 30 of appropriate thickness.

Next, a second solution is brought into contact with the amine-containing layer. The second solution is a solution containing another material of the separation functional layer 30. Specifically, the second solution is a solution containing a polyfunctional acid halide as the other material of the separation functional layer 30 (this solution will hereinafter be referred to as "acid halide solution"). The contact of the acid halide solution with the amine-containing layer allows a polymerization reaction of the amine and the acid halide to proceed at the interface between the amine-containing layer and a layer of the acid halide solution. Thus, the separation functional layer 30 is formed.

The polyfunctional acid halide is an acid halide having a plurality of reactive carbonyl groups. Examples of the polyfunctional acid halide include an aromatic polyfunctional acid halide, an aliphatic polyfunctional acid halide, and an alicyclic polyfunctional acid halide.

Examples of the aromatic polyfunctional acid halide include trimesic acid trichloride, terephthalic acid dichloride, isophthalic acid dichloride, biphenyldicarboxylic acid dichloride, naphthalenedicarboxylic acid dichloride, benzenetrisulfonic acid trichloride, benzenedisulfonic acid dichloride, and chlorosulfonyl benzenedicarboxylic acid dichloride.

Examples of the aliphatic polyfunctional acid halide include propanedicarboxylic acid dichloride, butanedicarboxylic acid dichloride, pentanedicarboxylic acid dichloride, propanetricarboxylic acid trichloride, butanetricarboxylic acid trichloride, pentanetricarboxylic acid trichloride, glutaryl halide, and adipoyl halide.

Examples of the alicyclic polyfunctional acid halide include cyclopropanetricarboxylic acid trichloride, cyclobutanetetracarboxylic acid tetrachloride, cyclopentanetricarboxylic acid trichloride, cyclopentanetetracarboxylic acid tetrachloride, cyclohexanetricarboxylic acid trichloride, tetrahydrofurantetracarboxylic acid tetrachloride, cyclopentanedicarboxylic acid dichloride, cyclobutanedicarboxylic acid dichloride, cyclohexanedicarboxylic acid dichloride, and tetrahydrofurandicarboxylic acid dichloride.

One polyfunctional acid halide selected from these polyfunctional acid halides may be used alone, or two or more selected from these polyfunctional acid halides may be used in combination. An aromatic polyfunctional acid halide may be used in order to obtain the separation functional layer 30 having high salt rejection performance. A polyfunctional acid halide having three or more valences may be used as at least part of the polyfunctional acid halide component to form a cross-linked structure.

As the solvent of the acid halide solution there can be used an organic solvent, in particular a non-polar organic solvent. The organic solvent is not particularly limited as long as the organic solvent has low solubility in water and can dissolve the polyfunctional acid halide component without deteriorating the porous support membrane 20. Examples of the organic solvent include saturated hydrocarbons such as cyclohexane, heptane, octane, and nonane and halogen-substituted hydrocarbons such as 1,1,2-trichlorotrifluoroethane. A saturated hydrocarbon having a boiling point of 300° C. or lower or 200° C. or lower may also be used.

The concentration of the acid halide component in the acid halide solution may be in the range of 0.01 to 5 wt % and may be in the range of 0.05 to 3 wt %. When the concentration of the acid halide component is properly adjusted, the amounts of the amine and halide components remaining unreacted can be reduced. Additionally, the occurrence of defects such as pinholes in the separation functional layer 30 can be reduced, and thus the separation membrane 10 having high salt rejection performance can be provided. Further, the proper adjustment of the concentration of the acid halide component leads to proper adjustment of the thickness of the separation functional layer 30, thus providing the separation membrane 10 capable of achieving a sufficient permeation flux.

The method for bringing the acid halide solution into contact with the amine-containing layer is not particularly limited. The amine-containing layer may be immersed in the acid halide solution together with the porous support membrane 20, or the acid halide solution may be applied to a surface of the amine-containing layer. The time of contact between the amine-containing layer and the acid halide solution is, for example, 10 seconds to 5 minutes or 30 seconds to 1 minute. The contact between the amine-containing layer and the acid halide solution may be followed by the step of removing the excess of the acid halide solution from the amine-containing layer.

Next, the separation functional layer 30 is heated and dried together with the porous support membrane 20. The heat treatment of the separation functional layer 30 can improve the properties such as the mechanical strength and the heat resistance of the separation functional layer 30. The heating temperature is, for example, 70 to 200° C. or 80 to 130° C. The heating time is, for example, 30 seconds to 10 minutes or 40 seconds to 7 minutes. A drying step may be carried out at a room temperature, and subsequently another drying step may be carried out using a dryer at an ambient temperature higher than the room temperature.

The conditions under which interfacial polymerization is carried out are described, for example, in JP 58-24303 A and JP 1-180208 A. Such known techniques can be employed in the method of the present embodiment.

Various additives can be added to the aqueous amine solution and/or the acid halide solution in order to facilitate the formation of the separation functional layer 30 or improve the performance of the separation membrane 10 to be obtained. Examples of the additives include: a surfactant such as sodium dodecylbenzenesulfonate, sodium dodecyl sulfate, and sodium lauryl sulfate; a basic compound, such as sodium hydroxide, trisodium phosphate, and triethylamine, which has an effect on removal of halogenated hydrogen produced as a result of polymerization; an acylation catalyst; and a compound as described in JP 8-224452 A which has a solubility parameter of 8 to 14 $(cal/cm^3)^{1/2}$.

By carrying out the above steps, a membrane having the porous support membrane 20 and the separation functional layer 30 is obtained. The thickness of the separation functional layer 30 is not particularly limited. The thickness is, for example, 0.05 to 2 μm and may be 0.1 to 1 μm.

The present specification describes a method in which the separation functional layer 30 is formed directly on a surface of the porous support membrane 20 by interfacial polymerization. It should be noted that the separation functional layer 30 may be formed on a support other than the porous support membrane 20, and the separation functional layer 30 obtained may be placed on and joined to the porous support membrane 20. In other words, the separation functional layer 30 may be transferred onto the porous support membrane 20 from the other support.

Next, a solution containing a material of the coating 40 is brought into contact with the separation functional layer 30. The material of the coating 40 can be a polymer having a repeating unit represented by the following formula (1).

In the formula (1), $N^+$ is a nitrogen atom constituting a quaternary ammonium cation. $R^1$ and $R^2$ are each independently a substituent containing a carbon atom bonded to the nitrogen atom.

When the coating 40 contains the polymer having the repeating unit represented by the formula (1), the quaternary ammonium cation is always positively charged irrespective of the pH of raw water. This prevents adhesion of cationic substances to the surface of the separation membrane 10. The use of the polymer having the repeating unit represented by the formula (1) makes this effect particularly significant.

In the formula (1), the counterion for $N^+$ is not particularly limited. The counterion for $N^+$ is a monovalent anion. Examples of the monovalent anion include halogen ions such as $F^-$, $Cl^-$, $Br^-$, and $I^-$.

In the formula (1), $R^1$ and $R^2$ may each be an alkyl group. Examples of the alkyl group include a methyl group, an ethyl group, and a propyl group. In particular, $R^1$ and $R^2$ may each be a methyl group. When $R^1$ and $R^2$ are each an alkyl group such as a methyl group, the coating 40 can sufficiently reduce a decrease in water permeability of the separation membrane 10. When $R^1$ and $R^2$ are each an alkyl group such as a methyl group, the coating 40 causes less influence on the permeation flux of the separation membrane 10.

In the formula (1), $R^1$ may be a methyl group, while $R^2$ may be a 3-chloro-2-hydroxypropyl group. In this case, the repeating unit of the polymer is represented by the following formula (2).

(2)

In the formula (1), $R^1$ may be a methyl group, while $R^2$ may be a 2,3-epoxypropyl group. In this case, the repeating unit of the polymer is represented by the following formula (3).

(3)

When an alkali is allowed to act on the repeating unit represented by the formula (2), the 3-chloro-2-hydroxypropyl group undergoes a cyclization reaction. This reaction converts the repeating unit represented by the formula (2) to the repeating unit represented by the formula (3).

The polymer contained in the coating 40 can be a copolymer of a first monomer and a second monomer. The first monomer can be a monomer containing a quaternary ammonium cation and serving to form the repeating unit represented by the formula (1). The first monomer can be 3-chloro-2-hydroxypropylmethyl diallyl ammonium chloride. When the second monomer is diallylmethylamine hydrochloride, the copolymer is represented by the following formula (4).

(4)

In the formula (4), m and n are each independently an integer of 1 or more. Part or all of the 3-chloro-2-hydroxypropyl groups contained in the polymer of the formula (4) may be a 2,3-epoxypropyl group as shown in the formula (3).

In the copolymer represented by the formula (4), the 3-chloro-2-hydroxypropyl group and/or the 2,3-epoxypropyl group contained in the first monomer can be a reactive substituent capable of being chemically bonded to the separation functional layer 30.

The polymer of the formula (4) can be obtained also by modification of a homopolymer. Specifically, a homopolymer of methyldiallylamine hydrochloride can be modified with epichlorohydrin to obtain the polymer of the formula (4).

The reactive substituent enhances the bond strength between the separation functional layer 30 and the coating 40. Specifically, at least part of the reactive substituents forms a covalent bond with a terminal amino group, a remaining amino group, or a remaining carbonyl group of the separation functional layer 30. Thus, the coating 40 is secured to the separation functional layer 30, so that the separation membrane 10 whose water permeability is unlikely to be decreased even in long-term use can be provided. The terminal amino group and the remaining amino group of the separation functional layer 30 are derived from the polyfunctional amine. The remaining carbonyl group of the separation functional layer 30 is derived from the polyfunctional acid halide. The reactive substituent may be used in intramolecular cross-linking and/or intermolecular cross-linking of the polymer. Such cross-linking can improve the properties such as the mechanical strength and the heat resistance of the coating 40.

The reactive substituent in the polymer represented by the formula (4) may be a hydroxy group. The reactive substituent in a polymer represented by the formula (5) described later may be an amino group. The reactive substituent in a polymer represented by the formula (6) described later may be an amide group. The reactive substituent in a polymer represented by the formula (7) described later may be a hydroxy group.

The reactive substituent may be contained in the second monomer. When the first monomer has a quaternary ammonium cation structure, fewer restrictions are imposed on the second monomer. That is, there is a lot of flexibility in choosing the second monomer.

The reactive substituent is not limited to a 3-chloro-2-hydroxypropyl group. Examples of the reactive substituent include an epoxy group, a hydroxy group, an amino group, and an amide group. One substituent selected from these reactive substituents may be contained alone in the polymer, or two or more selected from these reactive substituents may be contained in the polymer.

When the reactive substituent is contained in the second monomer, the second monomer is, for example, allylamine. The polymer is represented by the following formula (5).

(5)

In the formula (5), m and n are each independently an integer of 1 or more.

When the reactive substituent is contained in the second monomer, the second monomer is, for example, acrylamide. The polymer is represented by the following formula (6).

(6)

In the formula (6), m and n are each independently an integer of 1 or more.

When the reactive substituent is contained in the second monomer, the second monomer is, for example, 3-chloro- 2-hydroxypropyl diallyamine hydrochloride. The polymer is represented by the following formula (7).

(7)

In the formula (7), m and n are each independently an integer of 1 or more.

One monomer selected from 3-chloro-2-hydroxypropyl diallylamine hydrochloride, allylamine, and acrylamide may be used alone as the second monomer, or two or more selected from these monomers may be used as the second monomer.

The copolymer may be a random copolymer or a block copolymer.

The ratio between the first monomer and the second monomer is not particularly limited. For example, the ratio (first monomer:second monomer) is 5:95 to 95:5 and may be 30:70 to 70:30. When the ratio is within this range, the separation membrane 10 whose water permeability is decreased little can be provided. The weight-average molecular weight of the polymer or copolymer is not particularly limited and is, for example, 10,000 to 100,000.

The coating 40 can be formed by bringing an aqueous solution containing the polymer into the separation functional layer 30 to form a polymer-containing layer and then drying the polymer-containing layer. The method for bringing the aqueous solution into contact with the separation functional layer 30 is not particularly limited. The separation functional layer 30 may be immersed in the aqueous solution together with the porous support membrane 20, or the aqueous solution may be applied to a surface of the separation functional layer 30. The time of contact between the separation functional layer 30 and the aqueous solution is, for example, 10 seconds to 5 minutes. The contact between the separation functional layer 30 and the aqueous solution may be followed by the step of removing the excess of the aqueous solution from the separation functional layer 30. The aqueous solution may contain, in addition to water, a polar solvent other than water, such as an alcohol. A polar solvent other than water, such as an alcohol, may be used instead of water.

Next, the polymer-containing layer is heated and dried. The heat treatment of the polymer-containing layer can improve the properties such as the mechanical strength and the heat resistance of the coating 40. The heating temperature is, for example, 80 to 150° C. The heating time is, for example, 30 to 300 seconds. A drying step may be carried out at a room temperature, and subsequently another drying step may be carried out using a dryer at an ambient temperature higher than the room temperature.

By carrying out the above steps, the separation membrane 10 having the porous support membrane 20, the separation functional layer 30, and the coating 40 is obtained. The thickness of the coating 40 is not particularly limited and is, for example, 10 to 900 nm. The presence of the coating 40 can be confirmed by means of a transmission electron microscope. The composition analysis of the polymer contained in the coating 40 can be carried out by Fourier-transform infrared spectroscopy (FT-IR), X-ray photoelectron spectroscopy (XPS), or time-of-flight secondary ion mass spectrometry (TOF-SIMS).

Examples

[Experiment 1]
(Sample 1)

An aqueous amine solution containing 7 wt % of piperazine, 0.15 wt % of sodium dodecyl sulfate, 1.48 wt % of sodium hydroxide, and 6 wt % of camphorsulfonic acid was applied to a porous polysulfone support. After that, the excess of the aqueous amine solution was removed from the support to form an amine-containing layer on the support. Next, the surface of the amine-containing layer was immersed for 10 seconds in an acid halide solution obtained by solving 0.42 wt % of trimesic acid trichloride in an isoparaffinic solvent (IP Solvent 1016, manufactured by Idemitsu Kosan Co., Ltd.). After that, the excess of the acid halide solution was removed from the amine-containing layer, which was air-dried for 60 seconds and then placed in a hot air dryer at 120° C. for 3 minutes to form a separation functional layer on the porous polysulfone support. Next, the surface of the separation functional layer was immersed for 10 seconds in an aqueous solution containing 0.1 wt % of a polymer (UNISENCE KCA 101L, manufactured by SENKA Corporation). After that, the separation functional layer was air-dried for 30 seconds and then placed in a hot air dryer at 120° C. for 2 minutes to form a coating on the separation functional layer. In this manner, a separation membrane of Sample 1 was obtained. UNISENCE KCA 101L is a polymer represented by the formula (4).

(Sample 2)
A separation membrane was obtained in the same manner as in Sample 1, except that the concentration of the polymer in the aqueous solution was changed to 0.03 wt %.

(Sample 3)
A separation membrane was obtained in the same manner as in Sample 1, except that the concentration of the polymer in the aqueous solution was changed to 0.01 wt %.

(Sample 4)
A separation membrane was obtained in the same manner as in Sample 1, except that the polymer was changed to PAS-880 manufactured by Nittobo Medical Co., Ltd. and that the concentration of the polymer in the aqueous solution was changed to 0.05 wt %. PAS-880 is a copolymer represented by the formula (7). $R^1$ and $R^2$ are each a methyl group.

(Sample 5)
A separation membrane was obtained in the same manner as in Sample 1, except that the polymer was changed to PAS-880 manufactured by Nittobo Medical Co., Ltd.

(Sample 6)
A separation membrane was obtained in the same manner as in Sample 1, except that the polymer was changed to PAS-J-81 manufactured by Nittobo Medical Co., Ltd. PAS-J-81 is a copolymer represented by the formula (6). $R^1$ and $R^2$ are each a methyl group.

(Sample 7)
A separation membrane was obtained in the same manner as in Sample 1, except that the polymer was changed to PAA-1123 manufactured by Nittobo Medical Co., Ltd. PAA-1123 is a copolymer represented by the formula (5). $R^1$ and $R^2$ are each a methyl group.

The polymers used in Samples 4 to 7 belong to diallyldimethylammonium chloride polymers.

(Sample 8)

A separation membrane was obtained in the same manner as in Sample 1, except that the polymer was changed to polyvinyl alcohol.

(Sample 9)

A separation membrane was obtained in the same manner as in Sample 1, except that the polymer was changed to polyquaternium-10 (CATINAL HC-100 manufactured by TOHO Chemical Industry Co., Ltd.). CATINAL HC-100 is cellulose containing quaternary ammonium cation.

(Sample 10)

A separation membrane was obtained in the same manner as in Sample 1, except that no coating was formed on the surface of the separation functional layer.

[Performance Evaluation: Permeation Flux]

The permeation flux was measured for the obtained separation membranes. First, RO water (temperature: 25° C.) was passed through each of the separation membranes at an operating pressure of 1.5 MPa for 30 minutes. The permeation rate of the permeated water resulting from this operation was measured to calculate the permeation flux. Next, an aqueous solution (temperature: 25° C.) containing a cationic surfactant (CATIOGEN BC-50 manufactured by DKS Co., Ltd.) at a concentration of 1000 mg/liter was brought into contact with the separation membrane at an operating pressure of 1.5 MPa for 30 minutes. After that, RO water (temperature: 25° C.) was brought into contact with the separation membrane at an operating pressure of 1.5 MPa for 30 minutes. The permeation rate of the permeated water resulting from this operation was measured to calculate the permeation flux. The permeation flux retention rate was calculated using the following equation. The results are shown in Table 1.

Permeation flux retention rate (%)=100×(Permeation flux of RO water after contact with cationic surfactant)/ (Permeation flux of RO water before contact with cationic surfactant)

Permeation flux $(m^3/m^2/day)$=(Amount of permeate liquid/Membrane area/Sampling time)

TABLE 1

|  | Type of polymer | Concentration of polymer (%) | Permeation flux before contact with surfactant $(m^3/m^2/day)$ | Permeation flux after contact with surfactant $(m^3/m^2/day)$ | Permeation flux retention rate (%) |
| --- | --- | --- | --- | --- | --- |
| Sample 1 | UNISENCE KCA 101L | 0.10 | 1.50 | 1.05 | 70 |
| Sample 2 | UNISENCE KCA 101L | 0.03 | 1.70 | 1.15 | 68 |
| Sample 3 | UNISENCE KCA 101L | 0.01 | 1.85 | 1.24 | 67 |
| Sample 4 | PAS-880 | 0.05 | 2.35 | 1.68 | 71 |
| Sample 5 | PAS-880 | 0.10 | 2.30 | 1.70 | 74 |
| Sample 6 | PAS-J-81 | 0.10 | 2.30 | 1.57 | 68 |
| Sample 7 | PAA-1123 | 0.10 | 2.30 | 1.57 | 68 |
| Sample 8 | Polyvinyl alcohol | 0.10 | 1.90 | 1.08 | 57 |
| Sample 9 | Polyquaternium-10 | 0.10 | 1.40 | 0.81 | 58 |
| Sample 10 | Not applicable | — | 2.50 | 1.38 | 55 |

As shown in Table 1, the permeation flux retention rate of the separation membranes of Samples 1 to 7 was higher than that of the separation membranes of Samples 8 to 10. The permeation flux retention rate of the separation membranes of Samples 1 to 7 was 67% or more. The permeation flux retention rate of the separation membranes of Samples 8 to 10 was 58% at a maximum. That is, the separation membranes of Samples 1 to 7 exhibited a high permeation flux even after the exposure to the cationic substance.

Although having a surface coating, the separation membranes of Samples 8 and 9 exhibited a permeation flux retention rate equivalent to that of the separation membrane of Sample 10 having no surface coating. That is, the surface coatings of the separation membranes of Samples 8 and 9 made little contribution to the improvement in permeation flux retention rate.

[Experiment 2]

(Sample 11)

A separation functional layer was formed on a support by the following method using m-phenylenediamine instead of piperazine as a polyfunctional amine. Specifically, an aqueous amine solution containing 3.0 wt % of m-phenylenediamine, 0.15 wt % of dodecyl sodium sulfate, 2.15 wt % of triethylamine, 0.31 wt % of sodium hydroxide, 6 wt % of camphorsulfonic acid, and 1 wt % of isopropyl alcohol was applied onto a porous polysulfone support. After that, the excess of the aqueous amine solution was removed to form an amine-containing layer on the support. Next, the surface of the amine-containing layer was immersed for 7 seconds in an acid chloride solution obtained by solving 0.25 wt % of trimesic acid trichloride in a naphthenic solvent (Exxsol D40 manufactured by Exxon Mobil Corporation). After that, the excess of the acid chloride solution was removed from the amine-containing layer, which was air-dried for 20 seconds and then placed in a hot air dryer at 140° C. for 3 minutes to form a separation functional layer on the porous polysulfone support.

Next, the surface of the separation functional layer was immersed for 10 seconds in an aqueous solution containing 0.1 wt % of a polymer (UNISENCE KCA 101L manufactured by SENKA Corporation). After that, the separation functional layer was air-dried for 30 seconds and then placed in a hot air dryer at 120° C. for 2 minutes to form a coating on the separation functional layer. A separation membrane of Sample 11 was thus obtained.

(Samples 12 to 22)

Separation membranes of Samples 12 to 22 were prepared by providing a coating on the separation functional layer as prepared in Sample 11 in the same manner as in Sample 11 with the use of polymers described in the column headed "Type of polymer" of Table 2. The concentration of each polymer in the aqueous solution for coating formation is as described in Table 2.

"UNISENCE KCA 101L" manufactured by SENKA Corporation and used in Samples 11 to 13 is a polymer represented by the formula (4) herein. "PAS-880" manufactured by Nittobo Medical Co., Ltd. and used in Samples 14 and 15 is a polymer represented by the formula (7) herein wherein $R^1$ and $R^2$ are each a methyl group. "PAS-J-81" manufactured by Nittobo Medical Co., Ltd. and used in Sample 16 is a polymer represented by the formula (6) herein wherein $R^1$ and $R^2$ are each a methyl group. "PAA-1123" manufactured by Nittobo Medical Co., Ltd. and used in Sample 17 is a polymer represented by the formula (5) herein wherein $R^1$ and $R^2$ are each a methyl group. "PAS-H-5L" which is the polymer used in Sample 19 is a polymer having a structure represented by the formula (8), namely, a homopolymer of diallyldimethylammonium chloride.

(8)

The permeation flux retention rate was measured for the separation membranes of Samples 11 to 22 by the method previously described. The results are shown in Table 2.

TABLE 2

| | Type of polymer | Concentration of polymer (%) | Permeation flux before contact with surfactant ($m^3/m^2/day$) | Permeation flux after contact with surfactant ($m^3/m^2/day$) | Permeation flux retention rate (%) |
|---|---|---|---|---|---|
| Sample 11 | UNISENCE KCA 101L | 0.10 | 1.05 | 0.77 | 73 |
| Sample 12 | UNISENCE KCA 101L | 0.03 | 1.12 | 0.79 | 71 |
| Sample 13 | UNISENCE KCA 101L | 0.01 | 1.23 | 0.88 | 72 |
| Sample 14 | PAS-880 | 0.05 | 1.47 | 1.13 | 77 |
| Sample 15 | PAS-880 | 0.10 | 1.44 | 1.08 | 75 |
| Sample 16 | PAS-J-81 | 0.10 | 1.45 | 1.09 | 75 |
| Sample 17 | PAA-1123 | 0.10 | 1.44 | 1.07 | 74 |
| Sample 18 | UNISENCE KCA 101L PAS-880 | 0.03 0.02 | 1.40 | 1.08 | 77 |
| Sample 19 | PAS-H-5L | 0.05 | 1.47 | 1.02 | 69 |
| Sample 20 | Polyvinyl alcohol | 0.10 | 1.18 | 0.74 | 63 |
| Sample 21 | Polyquaternium-10 | 0.1 | 1.02 | 0.61 | 60 |
| Sample 22 | Not applicable | — | 1.54 | 0.89 | 58 |

As shown in Table 2, the permeation flux retention rate of the separation membranes of Samples 11 to 19 was higher than that of the separation membranes of Samples 20 to 22. The permeation flux retention rate of the separation membranes of Samples 11 to 18 was 71% or more. The permeation flux retention rate of the separation membrane of Sample 19 was 69%, which is slightly low. The permeation flux retention rate of the separation membranes of Samples 20 to 22 was 63% at a maximum. That is, the separation membranes of Samples 11 to 19 exhibited a high permeation flux even after the exposure to the cationic substance.

As can be seen from the results shown in Table 2, the reducing effect of the present disclosure on a water permeability decrease caused by contact with a liquid containing a cationic substance was sufficiently obtained even when the separation functional layer was formed using m-phenylenediamine as the material thereof.

The resistance of the separation membrane to the cationic substance and the water permeability to the liquid containing the cationic substance change depending on a structure of the substance composing the separation functional layer. This can be seen also by comparing the results shown in Table 1 and those shown in Table 2. Comparison between the values of the permeation flux retention rate shown in Table 1 and the values of the permeation flux retention rate shown in Table 2 leads to the conclusion that the values of the permeation flux retention rate shown in Table 2 were high in general. However, the tendencies based on the difference of the polymers used in the coating were very similar between the results in Table 1 and those in Table 2. This means that the reducing effect on a water permeability decrease caused by contact with a liquid containing a cationic substance is achieved by the polymers composing the coatings. It is therefore expected that a change of the composition of the polyamide composing the underlying separation functional layer will not result in a major change in the tendency of the effect to be obtained.

The separation membrane of the present disclosure can be used as a RO (reverse osmosis) membrane, a NF (nanofiltration) membrane, an UF (ultrafiltration) membrane, a MF (microfiltration) membrane, or a FO (forward osmosis) membrane.

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

What is claimed is:
1. A separation membrane comprising:
a separation functional layer composed of a polyamide; and
a coating covering the separation functional layer and containing a polymer having a repeating unit represented by the following formula (4), (5), or (7):

(4)

(5)

(7)

wherein

N⁺ is a nitrogen atom constituting a quaternary ammonium cation,

R¹ and R² are each independently a substituent containing a carbon atom bonded to the nitrogen atom, and m and n are each independently an integer of 1 or more.

2. The separation membrane according to claim 1, wherein in the formula (5), or (7), R¹ and R² are each an alkyl group.

3. The separation membrane according to claim 1, wherein in the formula (5), or (7), R¹ and R² are each methyl group.

4. The separation membrane according to claim 1, wherein the polymer is represented by the formula (4) or (7).

5. The separation membrane according to claim 1, further comprising a support supporting the separation functional layer.

6. The separation membrane according to claim 1, wherein the coating is in direct contact with the separation functional layer.

7. The separation membrane according claim 1, wherein at least part of a plurality of hydroxy groups in the polymer represented by the formula (4), at least part of a plurality of amino groups in the polymer represented by the formula (5), or at least part of a plurality of hydroxy groups in the polymer represented by the formula (7) forms a covalent bond with a terminal amino group, a remaining amino group, or a remaining carbonyl group of the separation functional layer.

* * * * *